United States Patent [19]
Gibson

[11] Patent Number: 6,156,428
[45] Date of Patent: Dec. 5, 2000

[54] BASE METAL PARTICLES HAVING ANISOMETRIC MORPHOLOGY

[76] Inventor: Charles P. Gibson, 2840 Fox Tail La., Oshkosh, Wis. 54904

[21] Appl. No.: 08/543,620

[22] Filed: Oct. 16, 1995

Related U.S. Application Data

[63] Continuation-in-part of application No. 08/459,715, Jun. 2, 1995, abandoned.

[51] Int. Cl.[7] .................................................. G02B 26/00
[52] U.S. Cl. ........................................ 428/402; 428/403
[58] Field of Search ................................. 428/402, 403; 75/255, 343; 420/4, 6, 8, 82, 441, 456

[56] References Cited

U.S. PATENT DOCUMENTS

| | | | |
|---|---|---|---|
| 4,290,799 | 9/1981 | Schroeder et al. | 75/5 A |
| 4,325,739 | 4/1982 | Biermann et al. | 106/290 |
| 5,179,993 | 1/1993 | Bak et al. | 164/46 |
| 5,308,552 | 5/1994 | Bak et al. | 252/570 |
| 5,376,463 | 12/1994 | Bak et al. | 428/547 |
| 5,520,717 | 5/1996 | Miller et al. | 75/345 |
| 5,650,872 | 7/1997 | Saxe et al. | 359/296 |

FOREIGN PATENT DOCUMENTS 2-004281  1/1990  Japan.

OTHER PUBLICATIONS

Gibson et al, "Synthesis and Characterization of Anisometric Cobalt Nanoclusters", Science (Wash., D.C.), 267(5202), 1338–40, 1995.

*Primary Examiner*—Hoa T. Le

[57] ABSTRACT

There is disclosed a method of making unsupported particles of a base metal selected from the group consisting of iron, cobalt, and nickel, which comprises combining an aqueous solution or suspension of a base metal salt, a strong base so that the resulting combination has an effective hydroxide ion concentration, and a reducing agent, which is then subjected to an autocatalytic reaction at about atmospheric pressure to form a precipitate of the metal. The unsupported base metal particles exhibit an anisometric morphology, generally platelet or disk-shaped, and have a relatively high aspect or width to thickness ratio, which is preferably three or greater, exhibit ferromagnetic properties, and one or more of these base metals may be formed to exhibit a single magnetic domain. The resulting precipitate of metal particles may be formed as an agglomerate as by subjecting the precipitate to aging or to external means.

19 Claims, 5 Drawing Sheets

BASE METAL PARTICLES HAVING ANISOMETRIC MORPHOLOGY

This application is a continuation-in-part application of Ser. No. 08/459,715, filed on Jun. 2, 1995 now abandoned.

FIELD OF THE INVENTION

This invention relates to base metal particles, agglomerates of the particles, and the method of producing same. In its more specific aspect, this invention relates to unsupported particles of iron, cobalt and nickel exhibiting an unique morphology, agglomerates of the particles, and to the method of producing same.

BACKGROUND AND PRIOR ART

Numerous investigations have been reported of attempts to produce colloidal base metals, particularly iron, cobalt and nickel. In this respect or in this context, the term "colloidal" refers to exceptionally small metal particles in which the size of the particles is less than about 1,000 nanometers (nm). Although the formation of these base metals from a solution of the corresponding metal salt with a strong reducing agent is known in the art, the results reported show either large particles (greater than 1,000 nm in size), or an impure product, and additionally, and most significantly, the metal particles produced are generally irregular in shape, or of a spherical, or isometric morphology. For example, Sapieszko et al. in *Corrosion*, Vol 36, pp 522–530, 1980, reported the hydrothermal (or hydrometallurgical) reduction of chelated nickel and cobalt by the reduction of the corresponding $M^{2+}$ ion from basic solutions. The process was conducted in an autoclave at high pressure and at 250° C., using a hydroxide concentration of 1.2 molar, a chelating agent such as ethylenediamine tetraacetic acid, and a reducing agent such as hydrazine or triethanol amine. A process of this type conducted under high pressures and elevated temperatures is potentially hazardous. Moreover, the cobalt and nickel particles produced by the process appear to be very irregular in shape, or of a spherical, or isometric morphology, and mostly of a size larger than 1000 nanometers (nm).

There have been attempts to synthesize particulate base metals from basic solutions at moderate temperatures (i.e., 100° C. or less) using hydrazine as the reducing agent, as disclosed in U.S. Pat. No. 4,214,893 to Harada et al. However, the process requires the use of a palladium catalyst ($Pd^{+2}$), a protein, and a magnetic field, which, as reported by Matijevic et al. in *Plating and Surface Finishing*, Vol. 62, pp. 958–965, 1975, invariably yields colloidal palladium coated by the base metal. Thus, the actual products of the palladium catalyzed reaction are cobalt coated palladium particles. In addition, the particles are spherical in shape.

Because aqueous iron, cobalt, and nickel cations are difficult to reduce, strong reducing agents must be employed. There are several reports discussing the use of sodium borohydride as the reducing agent, but the resulting products are spherical in shape and contain substantial amounts or are nearly all of the metal boride.

The prior art shows the electroless deposition of a metal ion, particularly nickel, to the corresponding metal film using basic solutions of hydrazine as the reducing agent. The final product, however, is a film and not a particle, and the use of a catalyst such as palladium is required.

Ultrasound has been used to produce colloidal metal, for example, by atomizing a molten metal, as repoted by Pohlman, et al., *Ultrasonics*, Vol 12, pp 11 et seq., 1974. The sonication of iron carbonyl and of cobalt carbonyl nitrosyl yields powders of amorphous metal, as reported by Suslick, et al, in *Nature*, Vol 353, pp 414–416, 1991, and by Suslick, *MRS Bulletin*, Vol 20, pp 29–34, 1995. The resulting metal particles are relatively large in size (greater than 1,000 nm), and irregular in shape.

No reference is known for the facile synthesis of unsupported base metal particles of iron, cobalt, and nickel of relatively small size from a solution or suspension of a salt of the corresponding metal at atmospheric pressure. Further, the prior art does not show the formation of such particles exhibiting a morphology that is essentially nonspherical and anisometric.

This invention has therefore as its purpose to provide for the facile synthesis of unsupported base metal particles of iron, cobalt, and nickel exhibiting anisometric morphology.

It is another object of the invention to provide for the formation of unsupported base metal particles of iron, cobalt, and nickel exhibiting anisometric morphology from a solution or suspension of a salt of the corresponding metal.

It is yet another object of the invention to provide for the formation of agglomerates from these base metal particles.

SUMMARY OF THE INVENTION

In its broadest aspect of the present invention, there is provided a process for the facile synthesis of unsupported base metal particles. Broadly, the process comprises combining an aqueous solution or aqueous suspension of an iron, cobalt, or nickel salt with a strong base and a reducing agent, and imposing on the resulting combination an autocatalytic reaction. Unsupported base metal particles are precipitated out. It is significant that the process is conducted at about atmospheric or ambient pressure, which is in sharp contrast to known hydrothermal or hydrometallurgical processes conducted in an autoclave under high pressures and elevated temperatures.

As used herein and in the appended claims, the term "salt" is intended to mean a compound containing a metal cation in combination with an anion, and would include, for example, a metal chloride, a metal sulfate, a metal nitrate, and a metal hydroxide.

The base metals useful in this invention for the production of unsupported base metal particles are the transition metals selected from the group consisting of iron, cobalt, and nickel. The small particles are considered in the art as being colloidal in size (i.e., not greater than about 1,000 nanometers).

A strong base, preferably an alkali metal hydroxide, e.g., sodium hydroxide, or an alkaline earth hydroxide, and a reducing agent are combined with a solution or suspension of a base metal salt. The resulting combination or admixture should have a hydroxide ion concentration sufficient to effect the reduction, and preferably of at least about one mole per liter. Other useful strong bases include, for example, potassium hydroxide, and lithium hydroxide. Suitable reducing agents include, for example hydrazine, a hydrazine salt, or organo-derivatives of hydrazine.

The resulting admixture comprising a metal salt (either in solution or suspension), strong base, and reducing agent, is then subjected to an autocatalytic reaction. In the practice of my invention, useful procedures for inducing or initiating autocatalysis include the use of ultrasound or moderate heating not greater than about the boiling point of the solution (at ambient pressure) which can vary depending upon the contents and concentration. The process is conducted at about ambient or atmospheric pressure. A precipitate or floc of the base metal results from the reduction step, which is recovered and then purified as by washing, preferably under an inert atmosphere. The resulting product of unsupported particles of the base metal are characteristically metal platelets (disk-shaped), meaning that the particles are wide but flat, and not necessarily circular. As used herein and in the appended claims, the term "precipitate" is intended to include floc or flocculant or flocculate. Generally, the particles have a maximum size of about 1,000 nm, and an average size of less than about 500 nm as measured in its longest dimension.

An "unsupported" metal particle as used herein and in the appended claims means that the particle is not synthesized directly onto a support, substrate, carrier, etc., such as a metal, plastic, or ceramic material. It should be understood, however, that the particles synthesized may be subsequently deposited onto a suitable support, substrate, carrier, or the like, as explained hereinbelow in greater detail.

Where desired, the unsupported base metal particles may be further treated to form a coating or conversion to other compounds such as an oxide, or may be coated with a different metal or such materials or elements as a precious metal (e.g., gold) or a rare earth or lanthanide metal or compound. In an alternative embodiment of the invention, the particles may be allowed to agglomerate as by aging, heating, or applying a magnetic field, and the agglomerated particles typically exhibit the random orientation. Thus, the metal particles may be formed into an agglomerate or aggregate upon settling or aging over a period of time, or by external means such subjecting the precipitate to a magnetic field or centrifugation.

The unsupported base metal particles exhibit an anisometric morphology, which is in contrast to an isometric morphology meaning that the axes are equidimensional such as in the case of a sphere, cube, or octahedron. Thus, the recovered particles are generally platelet or disk-shaped, of generally colloidal size, and have a relatively high aspect or width to thickness ratio, which is preferably three or greater. When the metal particles are deposited onto a suitable support, substrate, carrier, or the like, the particles adopt a preferred orientation so that the platelets align to be substantially coplanar with the surface of such a support, and a minor percent may be oriented on edge. The particles formed of cobalt, iron, and nickel exhibit magnetic properties, commonly referred to as ferromagnetic (i.e., iron-like) properties, but it should be understood that the ferromagnetic property may include one or more subclasses of ferromagnetism, namely, ferrimagnetism or superparamagnetism. In addition, sufficiently small particles of these metals may exhibit a behavior characteristic of single magnetic domains.

DETAILED DESCRIPTION OF THE INVENTION

Figure 1:
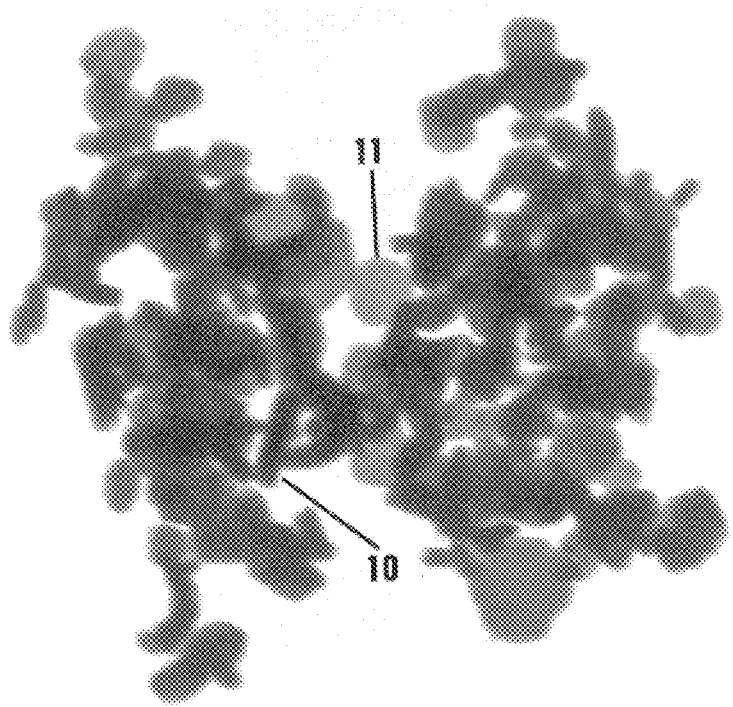
FIG. 1 is a transmission electron photomicrograph, magnified 56,000 times, of iron particles prepared in accordance of Example 1.

In accordance with the present invention, there is provided a facile procedure for making unsupported base metal particles having anisometric morphology (platelet-like) and further, depending largely upon the base metal salt used in the process and process conditions, the particles exhibit such properties as ferromagnetism, single-domain magnetism, and relatively high aspects (width to thickness ratio). Thus, the process results in the formation of unsupported base metal particles having unique and unexpected properties. The base metals utilized in the process of the invention, and therefore the metal recovered from the process as unsupported particles, are the metals selected from the group consisting of iron, cobalt, and nickel.

An aqueous solution of the base metal ion is formed as by dissolving a suitable salt of the base metal in water, as for example the metal chloride or nitrate, e.g., ferrous chloride, ferric chloride, cobalt chloride, and nickel chloride. Where desired, an aqueous suspension of a base metal compound may be first formed, as for example by using a hydroxide of the base metal compound such as cobaltous hydroxide. In some instances where a base metal salt is used, a suspension of the metal hydroxide will form upon the addition of the strong base, as will be more apparent from the description hereinbelow. The concentration of base metal in solution or in suspension is generally not critical with respect to recovery in that high yields of the product are obtainable. In this regard, however, a suitable soluble salt of the base metal generally affords better control of the process and therefore is preferred.

The solution or suspension of the base metal salt is treated or combined with a strong base and a reducing agent. The order of combining the base metal salt as solution or suspension with the strong base and reducing agent is immaterial, but I have found it more expedient to add the strong base to the solution or suspension of the base metal salt, and to this mixture subsequently add the reducing agent. Strong bases especially suitable for the process include the alkali metal hydroxides, e.g., lithium hydroxide, potassium hydroxide and sodium hydroxide, but alkaline earth hydroxides such as barium hydroxide and strontium hydroxide are also applicable. Sufficient base is used so that the resulting admixture of base metal, base, and reducing agent yields a hydroxide ion concentration of a critical level sufficient to precipitate out the metal particles when the autocatalytic reaction is initiated, and I have found that this level of concentration is generally at least about one-half mole per liter, and preferably at least about one mole per liter having a pH of about 14. The hydroxide ion concentration will depend largely on the base metal and on the specific process conditions employed, but the concentration can be higher which usually results in a faster reaction time in the reduction step to form the particles and also may result in the formation of a smaller and more uniform particle size. For example, in forming particles of cobalt, a hydroxide ion concentration of about three molar or higher is particularly desirable in achieving a high yield and in a reasonable time period.

As stated above, the order of combining the components is not necessarily critical, the reducing agent, as a step in the process, thus being combined or added to form the admixture. Hydrazine or a hydrazine salt are particularly desirable for use as a reducing agent, because of their availability and ease of control of the process. Also, an organic hydrazine such as methyl hydrazine may be useful. The amount or concentration of reducing agent should be sufficient to reduce most or substantially all of the base metal, which is about the stoichiometric equivalent of reducing agent to metal, but it is preferable to use excess reducing agent. For example, in the case of a base metal with a +2 valance and hydrazine as the reducing agent, for each mol of base metal it is preferable to use at least 2 moles of hydrazine.

The resulting combination or admixture of base metal salt (either as a solution or a suspension) is then subjected to an autocatalytic reaction at about atmospheric or ambient pressure. Accordingly, the self-sustaining or autocatalytic reaction is initiated either by the application of ultrasound (i.e., sonication) or by gentle heating. Sonicators are well known and commercially available, and the full power for a sonicator useful for the process of this invention, as well the percent of power used and time for sonication will vary depending to some extent upon the volume and composition of the material undergoing reduction, which can be determined by one having skill in the art. Sonication can generate some heat and thereby increase the temperature of the solution or suspension being treated, and it therefore may be more desirable to immerse the reactor or vessel containing the reaction contents or mixture in an ice bath in order to maintain an essentially constant temperature during the reduction step. Sonication may be achieved by immersing the sonicator horn or probe directly into the contents of the reactor, or externally by placing the reactor in a suitable bath of water or other liquid, and sonicating the bath.

Where desired, the autocatalytic reduction step may be initiated by gentle heating of the mixture. Heating is generally at a temperature not greater than about the boiling point of the solution (at ambient pressure), or slightly less, usually ranging from about 50–100° C. or slightly higher, preferably at least about 80° C., and may be accomplished by placing a covered container or vessel of the mixture in a steam bath. It should be understood that the boiling point for the solution will vary depending largely upon the components and the concentration. In some cases, it might be desirable to initiate the reaction with a combination of ultrasound and gentle heating.

It will be observed that the concentration of the base metal salt, the concentration of the strong base, the concentration of the reducing agent, and the power and time of sonication may vary. I have found that, when other factors remain constant, a higher base concentration yields a smaller particle size, a higher base metal concentration yields a larger particle size, and longer sonication or high power of sonication yields a smaller particle. Thus, these process conditions can be varied to help control particle size.

When the autocatalyic reduction reaction occurs, as under the influence of sonication or gentle heating, the particles precipitate or flocculate (as may be evidenced by a color change), and under the influence of gravity fall to the bottom of the reactor. The particles are then purified by washing with water. In order to accomplish this step, most of the supernatant is decanted or removed by suitable means such a cannula. The particles are resuspended in water, allowed to settle, and again the supernatant removed. This washing process is repeated until the pH of the removed liquid is about neutral or slightly above. Where desired, washing may be conducted under a protective atmosphere or blanket of an inert gas such as nitrogen. After the final wash, the product may be dried, preferably under vacuum or under a stream of dry nitrogen. It will be observed that the metal particles may oxidize when exposed to air, and therefore a pH of the final wash liquid in the range of between about 7 and 8, indicating a very small residue of reducing agent (e.g., hydrazine), is preferable because this residue acts as an oxygen scavenger and helps to inhibit oxidation. Rather than drying the product, it may be stored under water, or stored under a dilute solution of hydrazine, for later use.

The unsupported base metal particles formed or produced by the process of the present invention have or exhibit an anisometric morphology. That is, the unsupported particles are essentially platelet or disk-shaped, and the particles generally have a maximum size of about 1,000 nm, and an average size of less than about 500 nm, as measured in its longest dimension. Thus, the average particle size may range for the larger dimension from about five to 500 nanometers, but the shape and dimensions can vary depending largely on the concentration of base metal salt, the concentration of strong base, and the sonication conditions, as explained herein above. Further, the particles have a relatively high aspect (thickness to width ratio) of at least three, and preferably at least about five, but it should be understood that the aspect can be as high as 20 or higher. Particles having a high aspect are considered essential for use in magnetic recording media (e.g., audio tapes, and computer disks), because these particles facilitate alignment of the preferred magnetic axes of the particles, which is an essential feature for acceptable performance. In addition, particles with a high aspect may be useful in powder metallurgical application, as they may facilitate control of grain size and orientation in the finished product. Thus, for example, cobalt particles having a disk-shape have been found to measure about 100 nanometers wide and about 15 nanometers thick, giving an aspect of about six to seven; iron disks measure about 150 to 300 nanometers wide and 30 nanometers thick, giving an aspect of about five to 10; and nickel disks measure about five to 100 nanometers in width and 0.5 to 10 nanometers in thickness, giving an aspect of about 10 to 20. Also, it should be understood that the smaller the particle, in either dimension, the more difficult it is to accurately make these measurements because the particles are not always perfectly flat.

The unsupported base metal particles of this invention exhibit ferromagnetic properties, and certain of these particles exhibit a single magnetic domain. These properties can be particularly significant where the particles are used, for example, in such areas as permanent magnets or magnetic storage media.

When the particles are deposited onto a suitable support, substrate, carrier, or the like, (hereinafter referred to as "support") such as a polymeric film, the particles adopt a preferred orientation as platelets in a plane substantially coplanar with the surface of the support, and a minor percent are oriented on edge. Suitable polymer films include, for example, "Formvar" which is a polyvinyl formal marketed by Monsanto Chemical Co.; or "Collodian" which is a cellulose nitrate polymer marketed by Ladd Research Industries. Preferential orientation was shown by transmission electron microscopy. This is an important property, because oriented ferromagnetic particles affixed or bonded to a polymeric support are generally required for high-density magnetic storage media.

Where desired, the metal particles may be a useful catalyst, which can be formed by precipatating the metal from the solution or suspension of base metal directly onto a suitable carrier such as alumina, silica alumina, or aluminosilicate. If more convenient, the product produced by this invention may be resuspended in water, and then deposited onto the catalyst carrier. The formed catalyst may be subsequently treated by known techniques to improve its activity.

The unsupported metal particles of iron, cobalt, or nickel produced by the method of this invention may be subsequently treated to provide a coating. The coating may be by oxidizing or nitriding the metal particles, or by depositing another element or compound onto the particles, particularly other metals or metal compounds. Transmission electron microscopy has confirmed that the coating does not substantially alter the morphology of the base metal which remains anisometric. For example, the particles can be oxidized in an oxygen-containing atmosphere (e.g., air) at ambient temperature, and the oxide coating will grow progressively thicker as exposure to the air continues, but the metal "core" will remain anisometric. The oxidation process may be accelerated by using oxygen, or by gentle heating such as roasting at 200° C. The oxide coated particles exhibit magnetic properties, i.e., ferromagnetic, and the oxide coating improves the magnetic hardness. The particles may be nitrided, at least partially, as by heating in an atmosphere of nitrogen or ammonia. Where desired, the metal particles can be fully oxidized or nitrided. Also, the base metal particles can be coated with a precious metal such as by admixing in water the metal particles with a dissolved gold acid salt, and on reduction of the gold salt, gold coats the base metal particles. In accordance with an alternative embodiment of my invention, the base metal particles may be formed into an agglomerate or aggregate. For example, the metal particles can agglomerate upon settling or aging, that is by gravity, over a period of time, which can vary depending on concentration, the particular base metal, temperature, and the like. The formation of agglomerates can be facilitated by subjecting the resulting precipitate of base metal to a magnetic field or to centrifugation. Thus, the vessel containing the particles in an aqueous medium can be subjected to a magnetic field such as by sweeping the vessel with a permanent magnet. In this manner, an agglomerate of the metal is formed, which is essentially spherical in shape and may measure in diameter from about 0.1 to 10 μm, but size can vary depending upon such factors as the strength of the field, the condition of application, and the particular metal. Alternatively, the precipitate may be subjected to centrifugation, as for example at about 1,000 to 6,000 rpm for about one to 60 minutes. Here again, the agglomerate is spherical, and the size of the agglomerate can vary. Regardless of the method employed, the resulting agglomerate (sometimes referred to in the art as an aggregate) is washed and dried as described above. Further, the agglomerate generally exhibits random orientation, which means that the base metal platelets that comprise the agglomerate are not preferentially oriented in any particular direction. Where desired, the particles or the resulting agglomerate may be oxidized or nitrided, or coated with another or different metal, e.g. a precious metal, base metal, or lanthanide metal or compound, as explained above. Thus, the particles first formed may be so treated and then the agglomerate formed, or the agglomerate may be first formed and then treated, and as used herein and in the appended claims, both sequence of steps is intended to be included and will depend upon the metal, the final product desired, and the simpler step for the particular embodiment.

It will be observed that by reason of my invention the unsupported base metal particles, or agglomerates thereof, make them useful in the construction of high-density media, permanent magnets, in powder metal applications in which control of grain orientation and size is desirable, and in ceramic-metal composites (cermets). Further, the process is advantageous in that the product can be easily synthesized from relatively inexpensive reagents, and the product can be easily stored for subsequent use.

The following examples illustrate the novel base metal particles of this invention, and the method by which these particles are obtained; however, these examples are illustrative only and they are not intended to limit the invention claimed.

EXAMPLE 1

In a 250 mL beaker, one gram of ferrous chloride was dissolved in 10 mL of water. 25 mL of 50% by weight aqueous sodium hydroxide was added, and the resulting light green suspension was stirred with a glass rod. The hydroxide ion concentration was about 13 molar, based on the combination of materials. One gram of hydrazine hydrochloride was added, the beaker covered with a watch glass and placed in a steam bath. Conversion of the iron salt to unsupported iron particles, which settled to the bottom of the beaker, was complete after two hours.

In order to substantially purify the product by washing with water, the beaker was removed from the steam bath, and enough water was added to the beaker so that the volume of the contents was 200 mL. The admixture was stirred, and then allowed for the particles to settle to the bottom. Most of the supernatant was decanted. The washing process was repeated until the pH of the supernatant was less than about 8. After the final wash, the product was dried by removing the water under vacuum. Alternatively, the product may be stored under water, or stored under a dilute aqueous solution of hydrazine.

The product was an oxygen-sensitive silver-gray material consisting of very small, unsupported iron particles. Transmission electron microscopy (TEM) confirmed that the iron particles have an anisometric (platelet like) morphology, and generally measure less than 300 nm in width and 80 nm in thickness. The typical width/thickness ratio (aspect) for this product was in excess of three. FIG. 1 is a TEM photomicrograph (magnified 56,000 times) of the iron particles showing the size and morphology of the product. A particle on edge is shown at 10, and 11 shows a typical platelet configuration. Magnetic measurements with a Johnson-Matthey magnetic susceptibility balance confirmed that the product was ferromagnetic.

EXAMPLE 2

Fifty milligrams of cobaltous chloride was placed in a three dram vial, and dissolved in 2 mL of water. Three mL of 50 percent by weight aqueous sodium hydroxide was added, and the resulting admixture was cooled in an ice bath. A 300 watt sonicator from Fisher Scientific Company equipped with a microtip titanium horn was used to mix the solution and to initiate the reduction reaction.

The microtip probe was inserted into the contents of the vial and the contents mixed by sonication at 35% of full power. The sonicator was turned off, and 1 mL of 85% aqueous hydrazine hydrate was added. In the resulting admixture, the hydroxide ion concentration was about 9.4 molar. The autocatalytic reduction reaction was initiated by sonication at 35% of full power until the solution turned gray, and the conversion to product was complete in about 0.5 to 10 minutes. The contents of the vial were transferred to a 50 mL flask, then sealed with a septum, and connected to a gas manifold to supply nitrogen at a pressure slightly above atmospheric. The product was then purified by washing by first adding enough water so that the volume of the contents was about 25 mL. The washing procedure was conducted substantially as described in Example 1, and after the final wash the product was dried by removing the water under vacuum.

Figure 2:
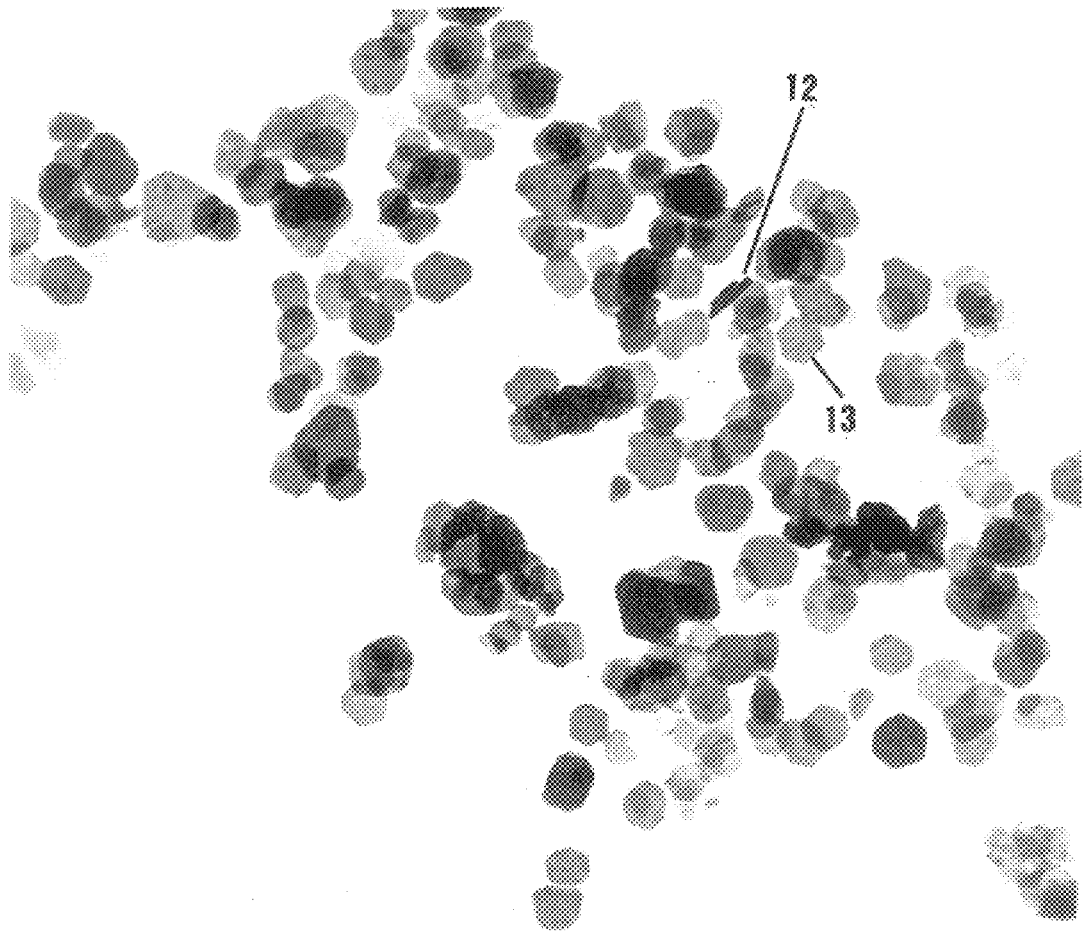
FIG. 2 is a transmission electron photomicrograph, magnified 71,000 times, of cobalt particles prepared in accordance of Example 2.

The product, which varied in color from silver-gray to black, consisted of very small cobalt particles. TEM confirmed that the cobalt particles have an anisometric (platelet) morphology, and generally measured less than about 250 nm in width and 30 nm in thickness. The typical width/thickness ratio (aspect) for this product was generally in excess of 5. FIG. 2 is a TEM photomicrograph (magnified 71,000 times) showing the size and morphology of the product. A particle on edge is shown at 12, and 13 shows a particle having a platelet configuration. Magnetic susceptibility measurements confirmed that the product was ferromagnetic.

EXAMPLE 3

Figure 3:
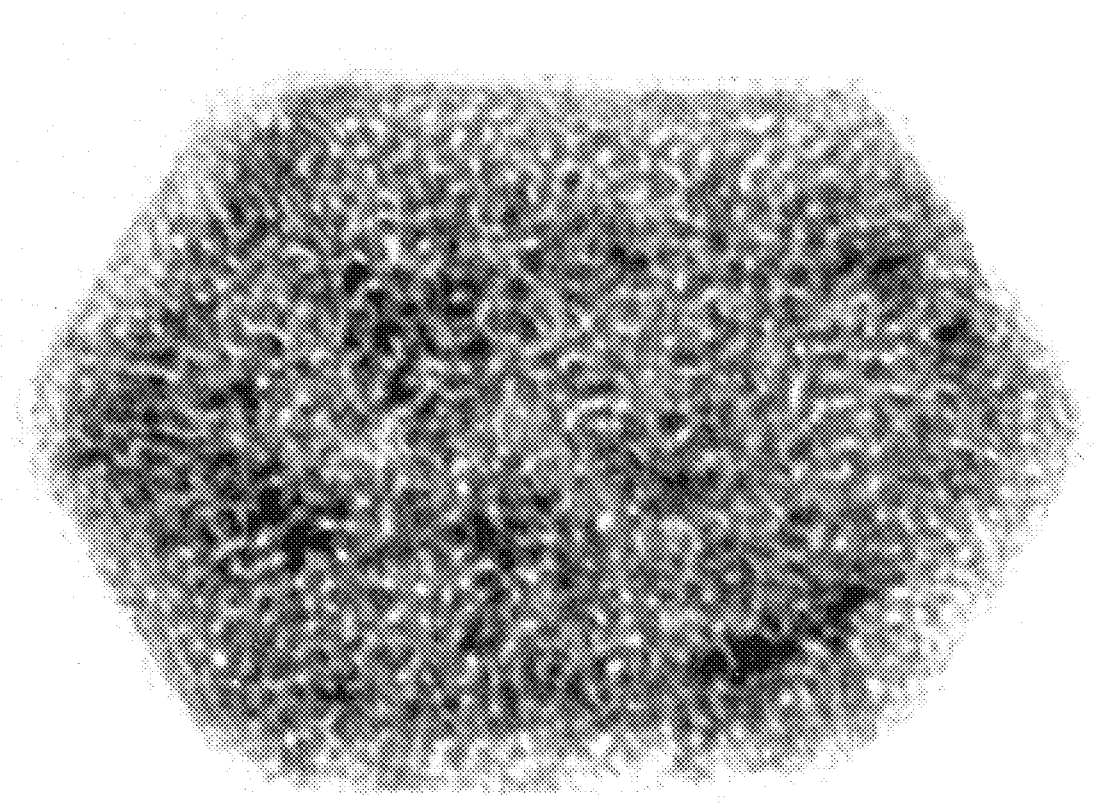
FIG. 3 is a transmission electron photomicrograph, magnified 800,000 times, of a cobalt particle prepared in accordance of Example 3.

The procedure of Example 2 was repeated except for using 25 mg of cobaltous chloride dissolved in 3 mL of water, to which was added 1 mL of aqueous sodium hydroxide and 1 mL of hydrazine hydrate. In the resulting admixture, the hydroxide ion concentration was about 3.8 molar. The cobalt platelets recovered had a typical particle size of about 100 nm in width and 15 nm in thickness, thereby showing an aspect (width/thickness ratio) of slightly more than 6. FIG. 3 is a TEM photomicrograph (magnified 800,000 times) of a single cobalt particle showing the platelet-like morphology. A single magnetic domain for these particles was confirmed by Lorentz microscopy.

EXAMPLE 4

Figure 4:
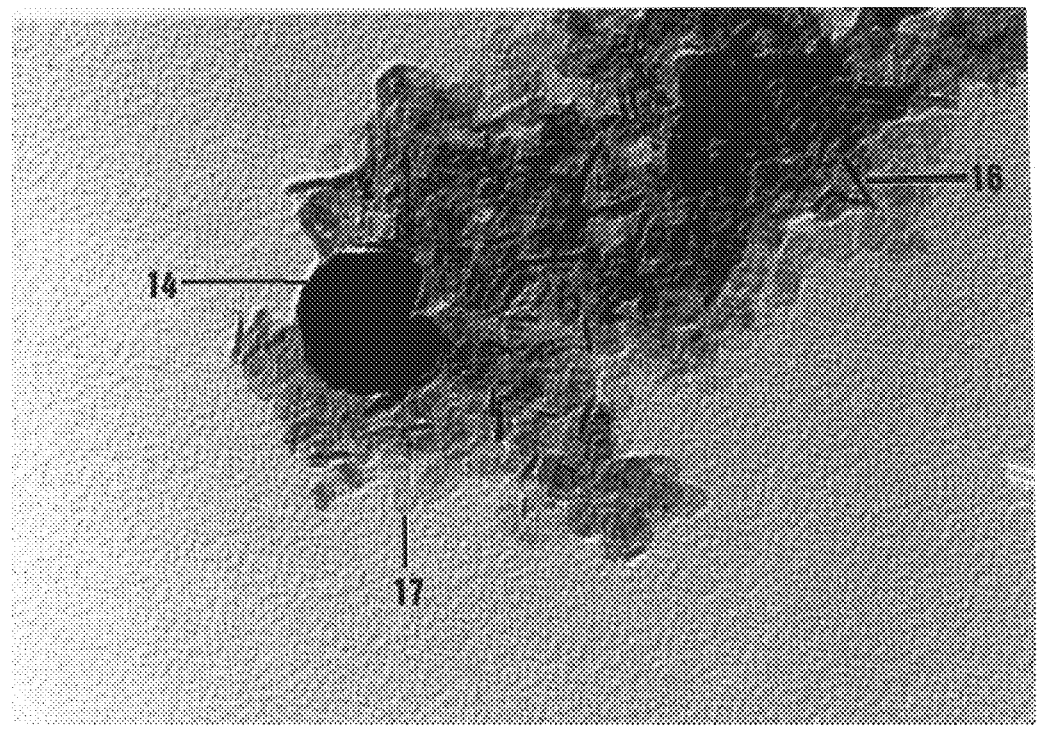
FIG. 4 is a transmission electron photomicrograph, magnified 450,000 times, of nickel particles prepared in accordance of Example 4.

In preparing nickel particles, the procedure of Example 2 was repeated except 200 mg of nickel chloride was used as the metal salt, 1.5 mL of aqueous sodium hydroxide was used as the strong base, and 1.5 mL of 85% aqueous hydrazine hydrate was used as the reducing agent. The hydroxide ion concentration for the resulting admixture was about 5.6 molar. The product varied in color from silver-gray to black, and consisted of very small, unsupported particles of nickel. TEM confirmed that the nickel particles have an anisometric (platelet) morphology, and generally measure about 15 nm in width and 2 nm in thickness, with an aspect generally greater than about 7. FIG. 4 is a TEM photomicrograph (magnified 450,000 times) showing the size and morphology of the product. As shown, 14 represents an agglomerate of particles, 16 shows a particle on edge, and a typical platelet configuration is shown at 17. Magnetic susceptibility measurements confirmed that the product was ferromagnetic.

EXAMPLE 5

Anisometric cobalt and nickel particles of Examples 2 and 4, respectively, which had been dried to give a silver-gray product, were exposed to air at ambient temperature. Within several hours, the particles formed a thin oxide coating at the surface, accompanied by a change in color from silver-gray to black. The coating grew progressively thicker, and within several weeks, oxidation is complete. TEM confirmed that oxidation occurs first at the surface and then progressively inward. Also, TEM showed that the oxide-coated particles have a morphology essentially the same as the original metal.

EXAMPLE 6

There were placed in a 3 dram vial 10 mg of the cobalt product of Example 2 and 5 mL of water. A 300 watt sonicator equiped with a water-filled stainless-steel cup horn and operating at 100% of power was used to mix the solution for 30 seconds. Then 0.5 mL of 0.002 M HAuCl4 was added to the vial, and the resulting mixture sonicated at 100% power for 5 minutes to initiate reduction of the gold salt. The sonicator was turned off, and the gold-coated cobalt particles settled out of solution. The supernatant was decanted and replaced with 5 mL of fresh water. The product was resuspended by sonication for 30 seconds at 100% power, and then allowed to settle. The supernatant was decanted, and the copper-colored solid particles were allowed to dry. Examination of the product by TEM and electron diffraction confirmed that gold-coated anisometric cobalt particles were formed.

EXAMPLE 7

In preparing cobalt agglomerates, the procedure of Example 2 was followed to make cobalt particles. The platelets contained in a 50 mL flask were submerged in water, and allowed to age for 24 hours. The water was then decanted, and the resulting material was dried under nitrogen. The product comprised agglomerates of cobalt particles. Alternatively, the flask containing the cobalt platelets was exposed to a magnetic field by sweeping a permanent magnetic across the outside of the flask. This product comprised agglomerates that were essentially identical to those made by aging.

Figure 5:
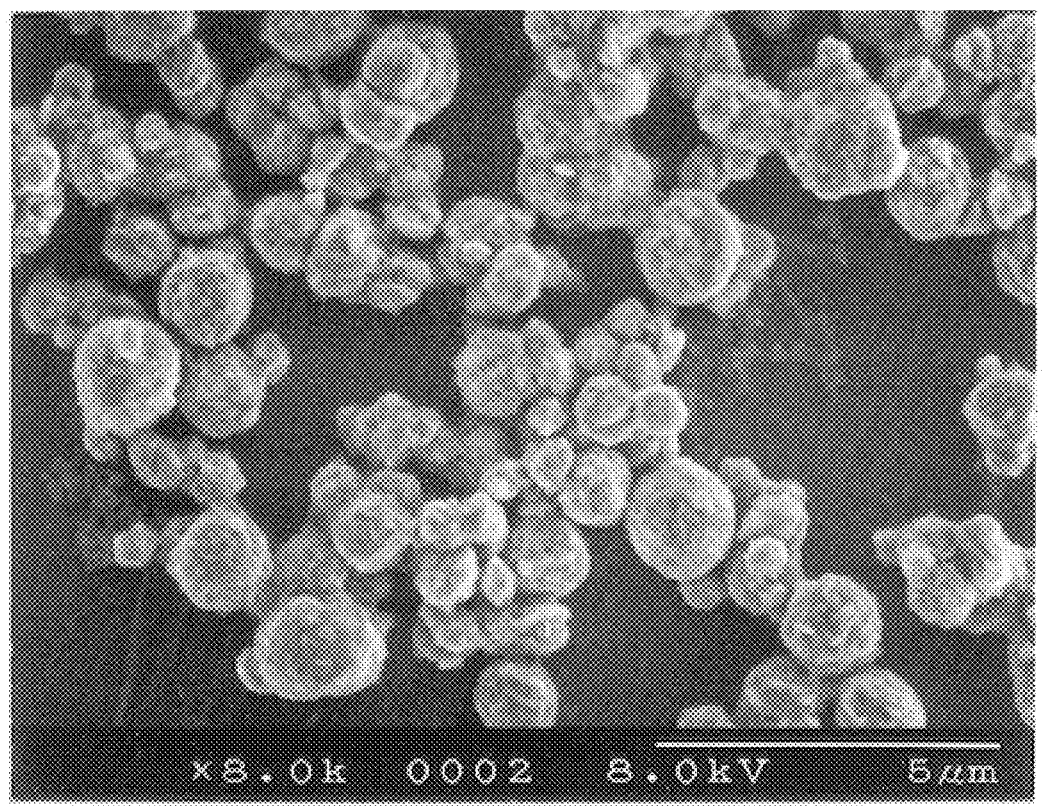
FIG. 5 is a scanning electron micrograph, magnified 8,000 times, of cobalt particles prepared in accordance of Example 7.

The agglomerates were essentially spherical in shape and typically measured one to 10 $\mu$m in diameter. FIG. 5 is a scanning electron micrograph of a group of agglomerates. Careful examintation of the agglomerates revealed that they were composed of cobalt platelets, and that the platelets were oriented in random directions.

The foregoing descriptions and examples show clearly the novelty and utility of the invention, and the several advantages of the process and product.

What is claimed is:

1. A base metal selected from the group consisting of iron, cobalt, and nickel characterized by unsupported particles as platelets having a maximum size of not greater than about 300 nanometers, having an aspect ratio of at least about three, and anisometric morphology.

2. A base metal according to claim 1 wherein said particles are at least partially oxidized.

3. A base metal according to claim 1 wherein said particles are at least partially nitrided.

4. A base metal according to claim 1 wherein said particles are coated with a different metal or compound of a metal.

5. A base metal according to claim 4 wherein said particles are coated with a precious metal.

6. A base metal according to claim 5 wherein said precious metal is gold.

7. A base metal according to claim 4 wherein said particles are coated with a different base metal.

8. A base metal according to claim 4 wherein said particles are coated with a lanthanide metal or a lanthanide compound.

9. A base metal according to claim 1 wherein said particles have ferromagnetic properties.

10. A base metal according to claim 9 wherein said particles exhibit a single magnetic domain.

11. An agglomerate of base metal particles of claim 1 and said agglomerate exhibiting random orientation of the platelets.

12. An agglomerate according to claim 11 wherein said particles are at least partially oxidized.

13. An agglomerate according to claim 11 wherein said particles are at least partially nitrided.

14. An agglomerate according to claim 11 wherein said agglomerate exhibits ferromagnetic properties.

15. An agglomerate according to claim 11 wherein said particles are coated with a different metal.

16. An agglomerate according to claim 15 wherein said different metal is a precious metal.

17. An agglomerate according to claim 16 wherein said precious metal is gold.

18. An agglomerate according to claim 15 wherein said different metal is a base metal other than iron, cobalt or nickel.

19. An agglomerate according to claim 15 wherein said different metal is a lanthanide metal or a lanthanide compound.

* * * * *